(12) United States Patent
Markowitz

(10) Patent No.: US 6,209,255 B1
(45) Date of Patent: Apr. 3, 2001

(54) GUARDED FISHING LURE HOLDER AND TACKLE TOTE

(76) Inventor: Paul Markowitz, 2214 Branch Pike, Cinnaminson, NJ (US) 08077

( * ) Notice: Subject to any disclaimer, the term of this patent is extended or adjusted under 35 U.S.C. 154(b) by 0 days.

(21) Appl. No.: 09/214,148

(22) PCT Filed: Feb. 27, 1998

(86) PCT No.: PCT/US98/03855

§ 371 Date: Jan. 31, 2000

§ 102(e) Date: Jan. 31, 2000

(87) PCT Pub. No.: WO98/37759

PCT Pub. Date: Sep. 3, 1998

(51) Int. Cl.[7] .................................................. A01K 97/06
(52) U.S. Cl. ....................................... 43/57.1; 206/315.11
(58) Field of Search .................................... 43/57.1, 54.1, 43/57.2, 57.3; 206/315.11; 224/249, 920

(56) References Cited

U.S. PATENT DOCUMENTS

| | | | |
|---|---|---|---|
| 595,998 | * | 12/1897 | Garland . |
| 2,604,720 | * | 7/1952 | Woodard . |
| 2,831,289 | * | 4/1958 | Klinghoffer . |
| 2,927,395 | * | 3/1960 | Bartlett . |
| 2,956,365 | * | 10/1960 | Smith . |
| 3,775,895 | * | 12/1973 | Jachim .................................. 43/57.5 |
| 4,486,971 | * | 12/1984 | Miller .................................... 43/57.3 |

* cited by examiner

*Primary Examiner*—Peter M. Poon
*Assistant Examiner*—Judith A. Nelson
(74) *Attorney, Agent, or Firm*—Donald C. Simpson (57) ABSTRACT

A fishing tackle tote (10) that has beveled slots (40) situated at various locations around the device. The beveled slot takes advantage of the shape of the hook inserted therein to cause the forces of friction to act on the inserted hook. Hooks of almost any size remain substantially in place during transport but are easily removable when it is desired to remove them and reduce the chance of injury because the hooked end is slightly recessed and is therefore shielded.

2 Claims, 8 Drawing Sheets

GUARDED FISHING LURE HOLDER AND TACKLE TOTE

The present invention relates to article carriers, and more particularly, to a carrier for holding fishing equipment that includes beveled slots that allow fishing lures to be held in place during transport but that allow easy removal of the lures when removal is desired.

BACKGROUND OF THE INVENTION

The sport of fishing often requires the person fishing (angler) to carry a substantial amount of equipment to the fishing site. This equipment can include rods, reels, bait, artificial lures, knives, weights, floats and the like. Often the angler will have different types of equipment for different types of fishing. For example, salt water fishing may require different types of equipment than that used for fresh water fishing or fly fishing. As a result, the angler must either carry unnecessary equipment to the fishing site or select only the equipment needed for the particular type of fishing planned and carry only that equipment to the site.

Tackle boxes have long been used for storing fishing equipment and/or for carrying selected equipment to a fishing site. These boxes come in a variety of shapes and sizes and often are compartmentalized to allow the angler to store the equipment in an organized manner.

U.S. Pat. No. 4,311,262 to Morin teaches a rod and reel caddy designed to assist the angler in transporting a plurality of rod/reel combinations. The caddy includes several openings to allow insertion of the reel end of the rod/reel combination therein, and also includes small holes situated around the perimeter of the caddy to allow insertion of fish hooks and/or the hooks of artificial lures.

U.S. Pat. No. 3,775,895 to Jachim teaches a container for fishing lures designed to hook over the gunwale of a boat. The container includes a notched bar extending across the box near the top so the it can receive the hooks on the lures, allowing them to hang within the box. A moveable spring-loaded clamping member engages the hooks after they have been placed on the slotted bar to prevent the hooks from coming out of the notches.

U.S. Pat. No. 4,006,553 to Porter et al. teaches a fishing lure tray that utilizes slots ("notches") along one wall of a lure compartment to receive the hook of a lure while the body of the lure lies in the compartment. A cover is moved into place to keep the hooks from jumping out of the slots.

U.S. Pat. No. 3,564,755 to Lindgren et al. teaches a snelled fish hook holder in which the hooks are inserted into a long slot and the snell is wrapped around the device and anchored.

U.S. Pat. No. 2,573,431 to Gibson teaches a tackle box that includes removable trays ("bait containers") that have a center handle for carrying. The trays include notches for keeping hooks and lures separate from each other and in place.

U.S. Pat. No. 5,440,829 to Parvin teaches a hook holding device that includes a series of holes into which hooks can be inserted to retain them in place. A rotatable cover is turned to cover the top of the inserted hook to keep it from jumping out of place.

U.S. Pat. No. Des. 238,873 to West is a design patent for a fishing lure holder. The device portrayed in the-West patent shows a series of slots along a top bar. It cannot be determined from the patent what the slots are for.

With any of the above devices, the hooks are either free to jump out of the holes/slots into which they are inserted or some additional means of holding the hooks in place is required (e.g. a moveable top or cover that comes down over the inserted hooks or the anchoring of the hooks using the snells). The slots allow substantial movement of the hook, i.e., they do not fit snugly in the slots. Thus, either the hooks can jump out during transport, or the angler must manipulate the top or cover out of the way to access the lure, both of which may inconvenience the angler.

BRIEF DESCRIPTION OF THE INVENTION

The present invention solves the problems of the prior art by providing a fishing tackle tote that has beveled slots situated at various locations around the device. The beveled slot takes advantage of the shape of the hook inserted therein to cause the forces of friction to act on the inserted hook. By forming the slots in this manner, the hooks of almost any size remain substantially in place during transport but are easily removable when it is desired to remove them. No cover is required to hold the lures/hooks in place, minimizing the manipulation required of the user. Hooks secured in this manner also reduce the chance of injury because the hooked end is slightly recessed and is therefore shielded. The device also includes open compartments to enable the user to carry a variety of other fishing equipment and giving the user easy access to such equipment.

DETAILED DESCRIPTION OF THE PREFERRED EMBODIMENT

Figure 1:
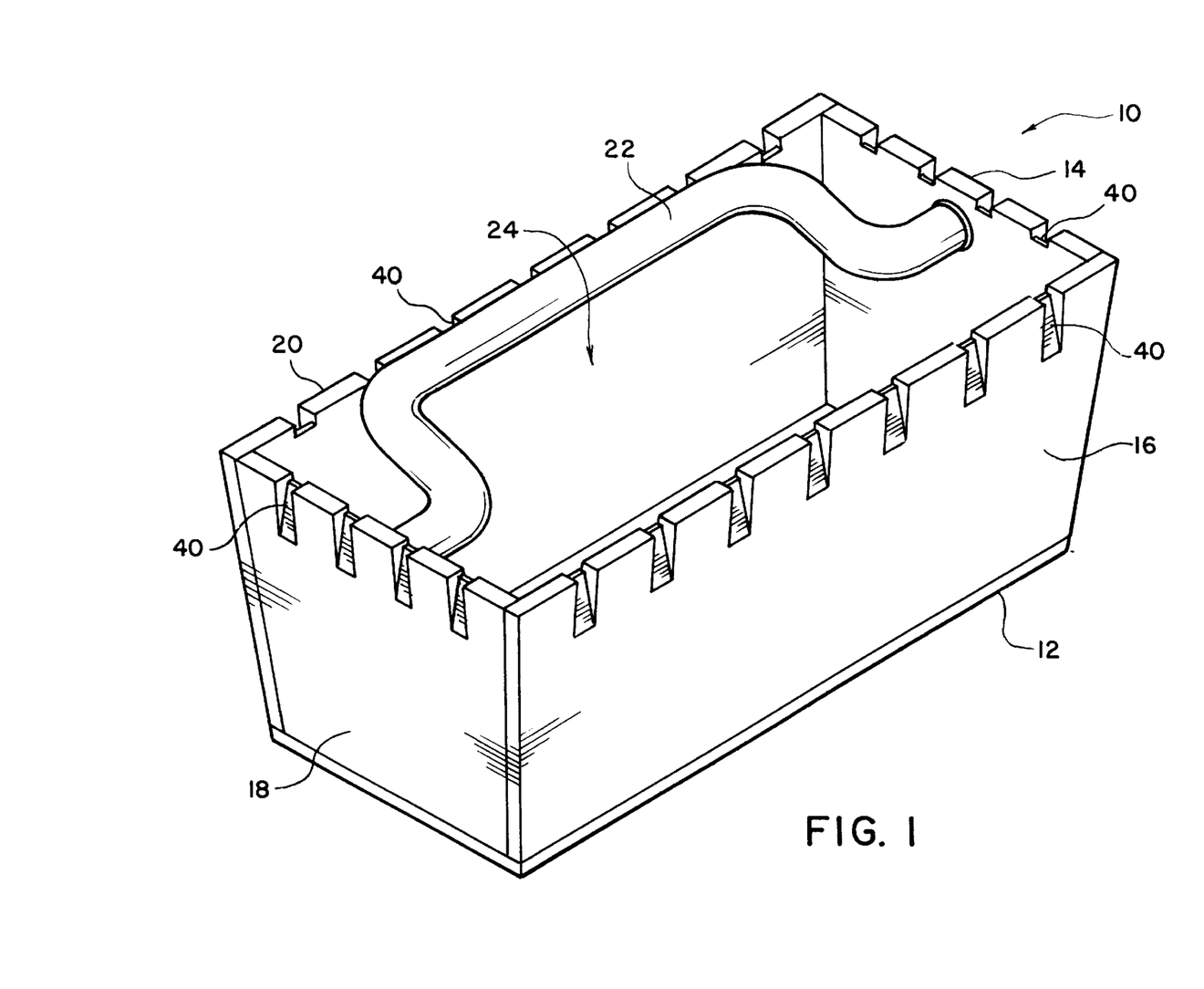
FIG. 1 is a perspective view showing a basic configuration for the fishing tackle tote of the present invention.

FIG. 1 shows a basic configuration for the fishing tackle tote 10 of the present invention. The fishing tackle tote includes a bottom 12, four side walls 14, 16, 18, and 20, and handle 22. A main compartment 24 is formed by the side walls 14, 16, 18, and 20 and the bottom 22. Optionally, the tote can include interior walls or dividers which may be slidable removable to allow maximum flexibility as to compartment size. These interior walls can create smaller sub-compartments within the main compartment 24 formed by the sidewalls.

Figure 2:
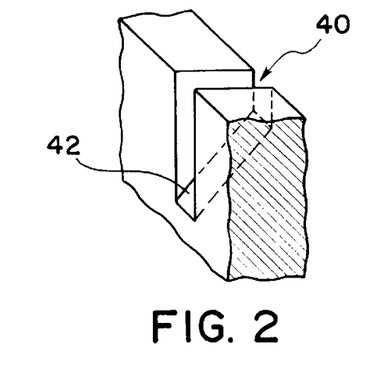
FIG. 2 is a cut-away perspective view showing one of the beveled slots of the present invention.

Situated along the top of any or all of the walls are beveled slots 40. The beveled slots 40 may vary in size, but each of them are beveled, as shown in more detail in FIGS. 2 and 3. As shown, each beveled slot 40 is cut into the wall such that the distance D1 is greater than the diameter of the hook wire for the lure but is less than the distance D2, thus creating an angled or beveled surface 42. The thickness of each side wall may vary; the applicant has found that a side wall having a thickness of ¼" to ⅜" is acceptable. With the smaller sizes of wall thickness, it maybe necessary to extend the sides of the beveled slots beyond the support wall to insure that the hooks held in the slot are adequately guarded against accidental contact by the user. The angle of the beveled surface 42 with respect to the side wall may also vary; however, the length D2 should be of sufficient length so that the pointed end of any hook placed in the beveled slot 40 will always contact the beveled surface 42 as shown in FIG. 3.

These beveled slots 40 may be situated along any wall, either interior or exterior (side) walls. It is most favorable to have the beveled slots 40 situated such that the beveled surface faces the outer edge of the side walls; this is the most desirable position because the lure will hang on the inside of the box. Thus, if one of the lures is knocked loose during, for example, removal of the lure from the box, the lure will tend to drop inside the box rather than outside the box.

Figure 3:
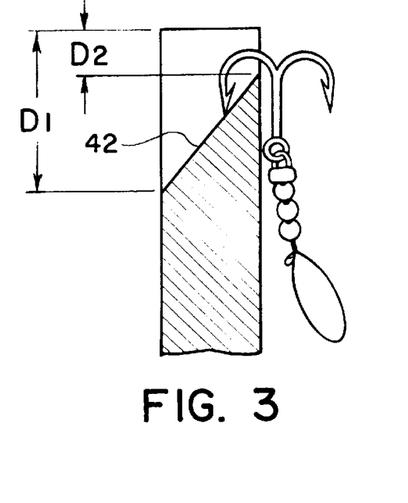
FIG. 3 is a cut-away side view showing a hook inserted in one of the beveled slots according to the present invention.
Figure 4A:
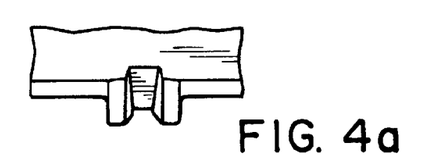
FIG. 4 presents cut-away views of an alternative version of beveled slots when the present invention is constructed from relatively thin materials.
Figure 4B:
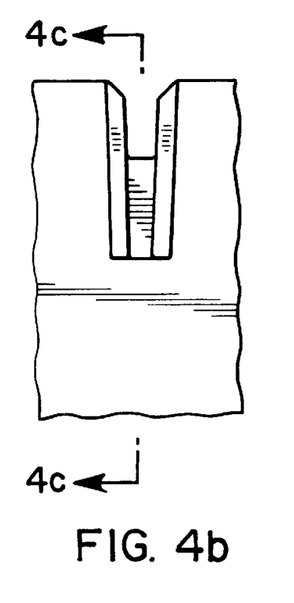
Figure 4C:
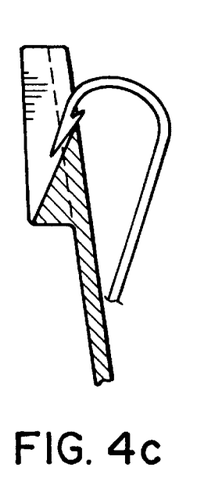
Figure 4D:
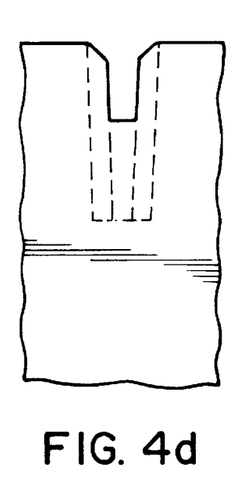
Figure 5:
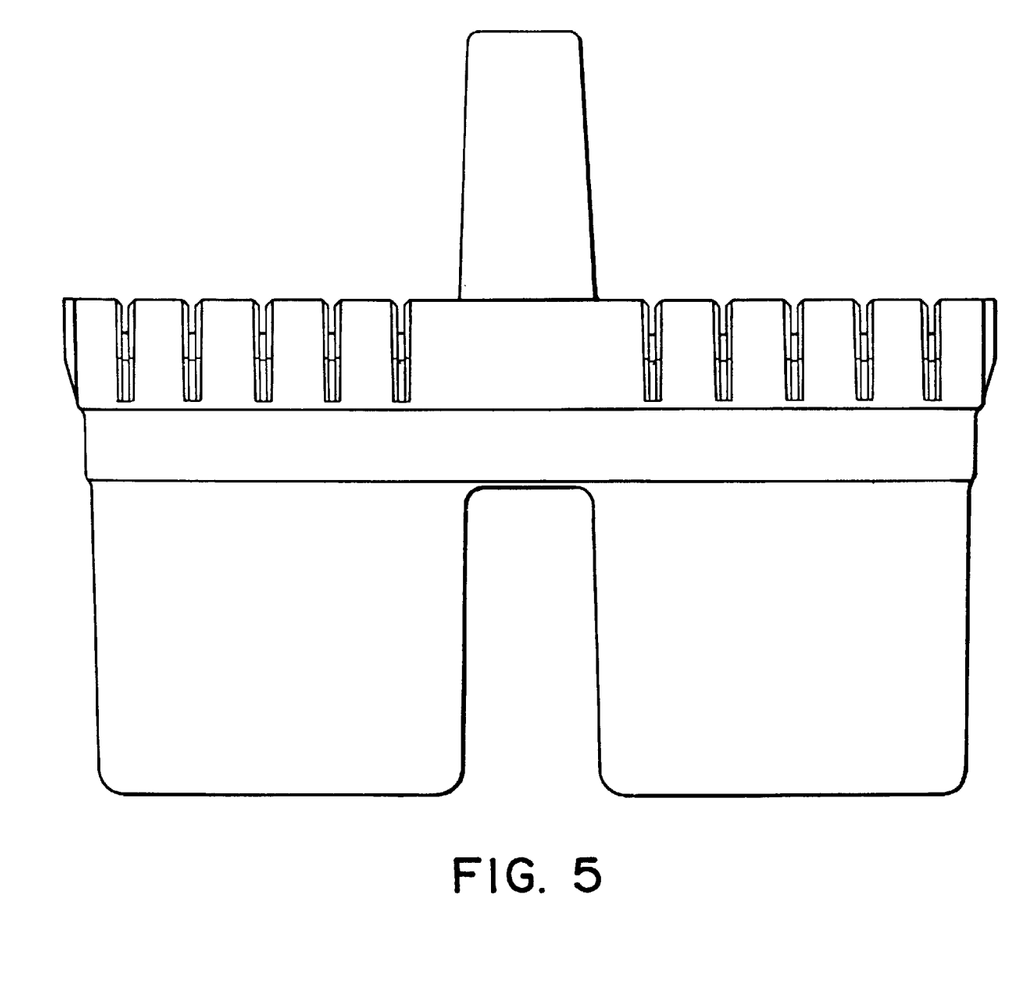
FIG. 5 is a side view of a preferred embodiment of the invention.
Figure 6:
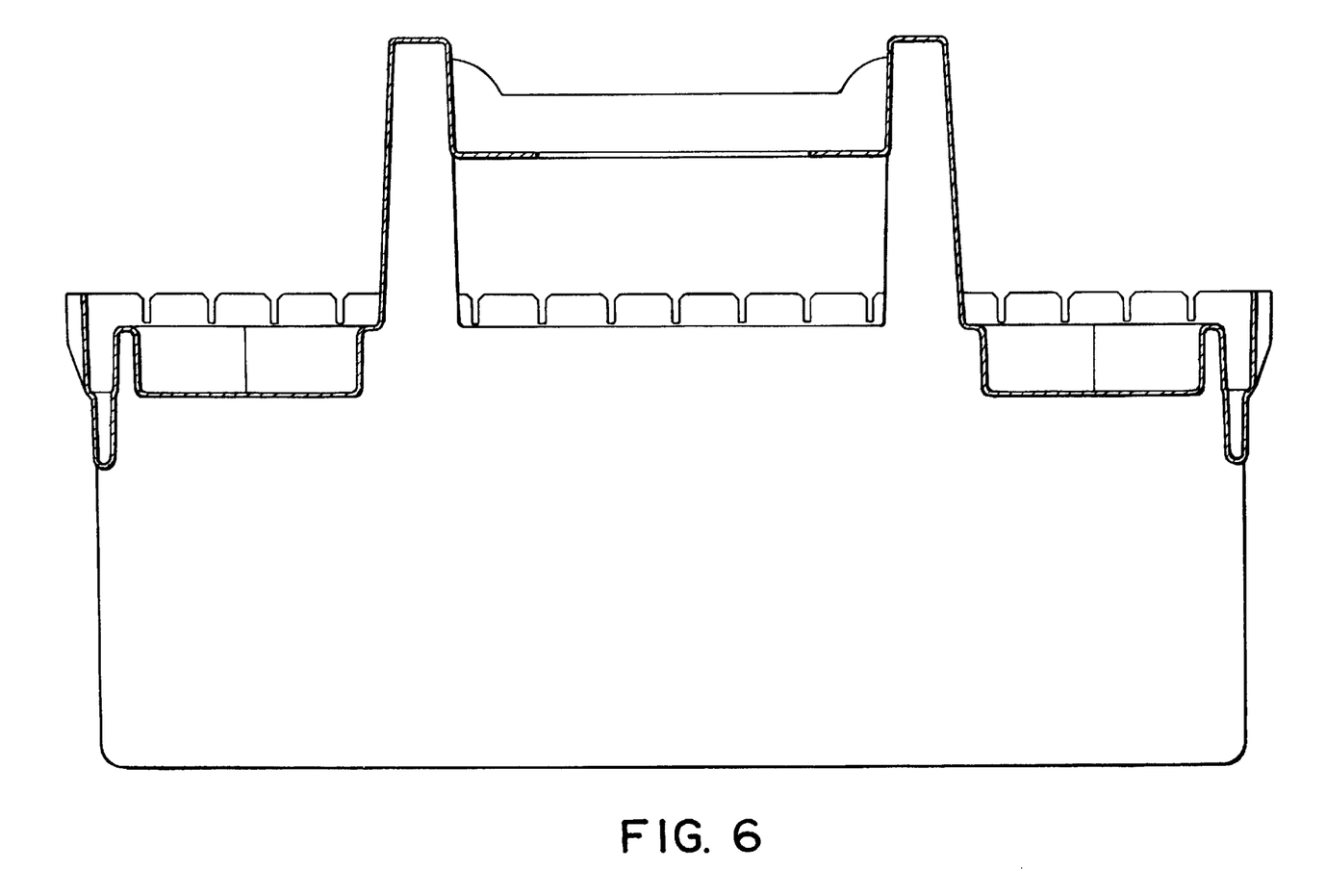
FIG. 6 is a cutaway section of the embodiment shown in FIG. 5.

As shown in FIG. 3, a hook placed in a beveled slot 40 will rest, point first, along the beveled surface 42. The weight of the lure pulls down on the hook point, and the beveled surface causes the hook to fit rather snugly in the slot. There is very little room for the hook to move, so as the user carries the box, the lure remains substantially in position.

The present invention can take several optional forms. For example, it may be desirable to alternate between the beveled slots 40 of the present invention and straight holes, such as the holes shown in the Morin patent, to cover the situation in which a particular device or lure might fit more readily in a hole rather than a slot. Further, there are numerous configurations for installing the "interior" walls so as to form compartments of different sizes and shapes. In a well known manner, the interior walls can be made removable by including slots into which the interior walls may slide. This would allow the user to form a different configuration depending upon the size and amount of equipment being brought on a particular fishing trip.

The walls and handle can be formed of any known material suitable for forming a box like structure with a handle. As previously mentioned, the wall material must be of a thickness that will allow the hook to hang onto the slot while the hook point does not extend beyond the beveled surface. The applicant has found that polyethylene, polypropylene, Lexan, and the like are useful as the wall material. Further, the applicant has used PVC piping to form the handle. Obviously, many other materials may be used for the walls and handle.

In the drawings and the above description, the slots are formed in a vertical orientation, i.e., the slotted portion is perpendicular with respect to the bottom of the tote. However, it may also be desired to use horizontally oriented slots in some locations. i.e., slotted portions that are parallel with respect to the bottom of the tote. These slots could be placed in horizontal shelf portions that do not have vertical walls. the shelf portion.

As an alternative to the above, the tote can be constructed using a molding technique such a extrusion molding, with the entire tote being a single piece, i.e., the handle, side walls, and interior walls are formed from a single mold. The walls and the majority of the tote could be much thinner than the approximately ⅜ inch thickness needed to form the beveled edge. The slotted portions are then molded so that a thicker "lip" portion extended outward, giving a thicker area in which the beveled slot is molded, as seen in FIG. 4. A tote so constructed is lighter in weight, very durable, and can be formed so that the totes are stackable for store display or storage.

Figure 7A:
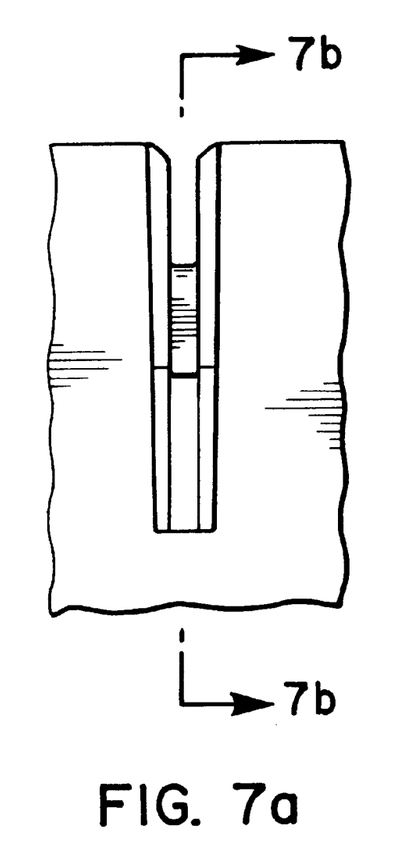
FIG. 7 illustrates the preferred retainer in detail.
Figure 7B:
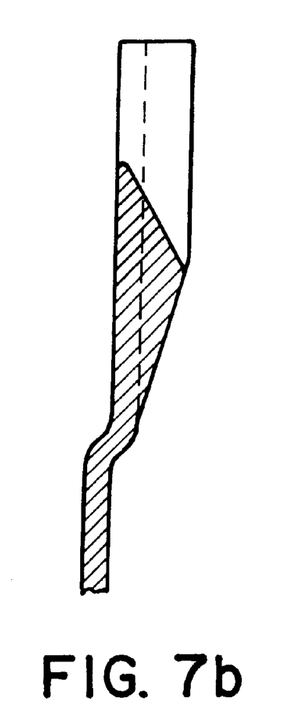
Figure 7C:
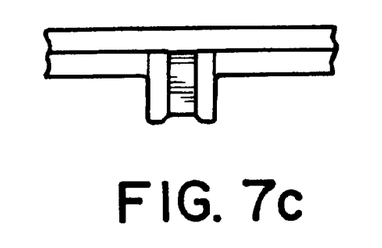
Figure 8:
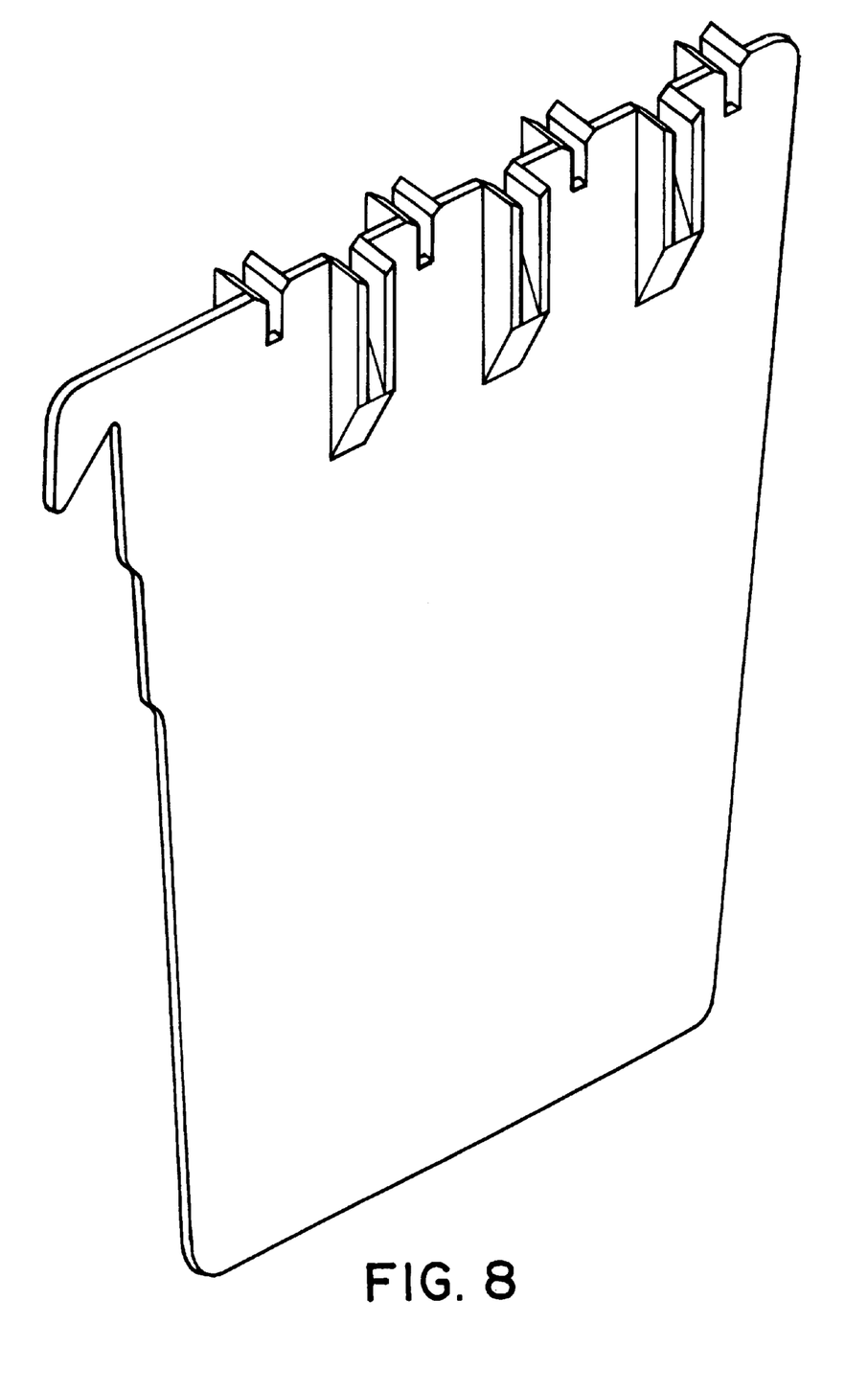
FIG. 8 illustrates a divider capable of being inserted into the fishing tackle tote of the present invention and containing the beveled slot for the holding and protection of hooks.
Figure 9A:
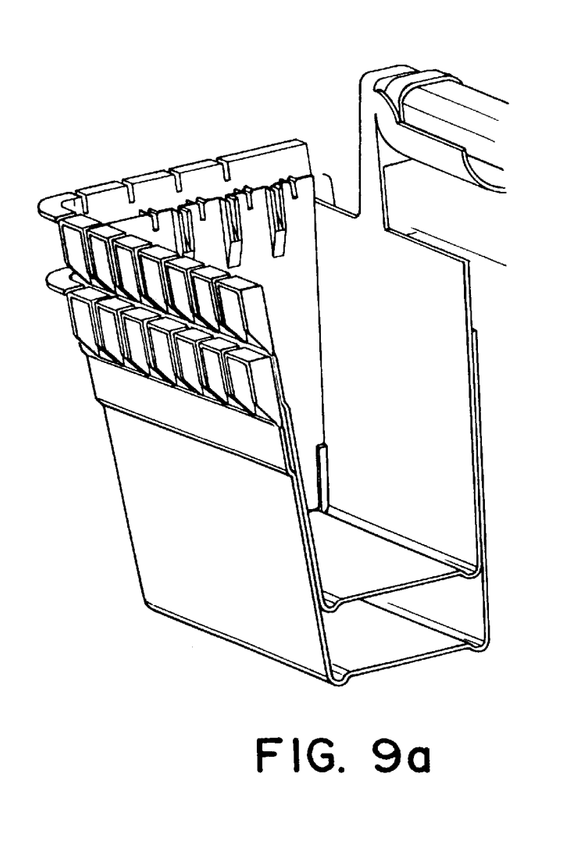
FIG. 9 illustrates the preferred embodiment of a pair of the fishing tackle totes of the present invention in nesting relation.
Figure 9B:
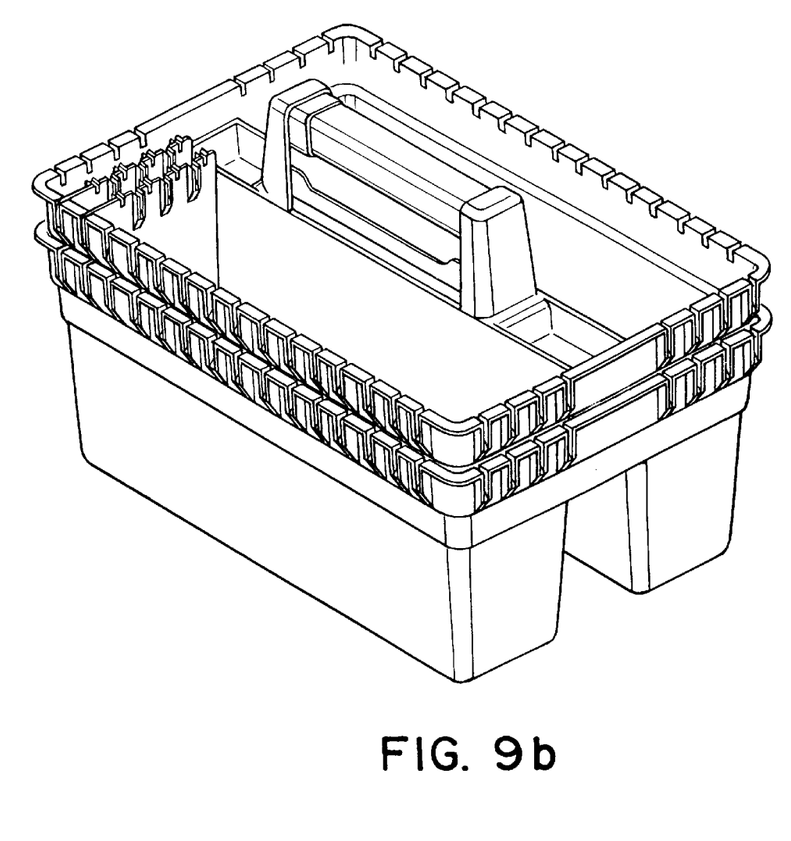

Important aspects of the "Hide a hook" beveled slot are emphasized in FIGS. 4, 8 and 9. The slot is beveled to a preferred angle of about 30 degrees. The embodiment of FIG. 7 differs from that of FIG. 4 in that in the preferred embodiment there is an opposing support angle below the slot to present a smooth transition. The right and left sides of the slot are enclosed to capture the hook from each side. The depth of the slot and the walls should approximate the size of the bits of a large lure, treble hook, about 3.45 inch. This depth, coupled with the enclosure, not only protects the angler from catching on the outside hook, but also helps to keep the lure from twisting. As can be seen from the drawings, the top of each side wall is chamfered to guide the hook into the slot.

On the divider shown in FIGS. 8 and 9, there is a securing hook which fits into a beveled "hide a hook" slot on the box. This mechanism locks together the divider and the box and allows the divider to be placed at any location where a beveled hook slot is found. This basically eliminates the need for divider guides along the inside of the box.

Figure 10:
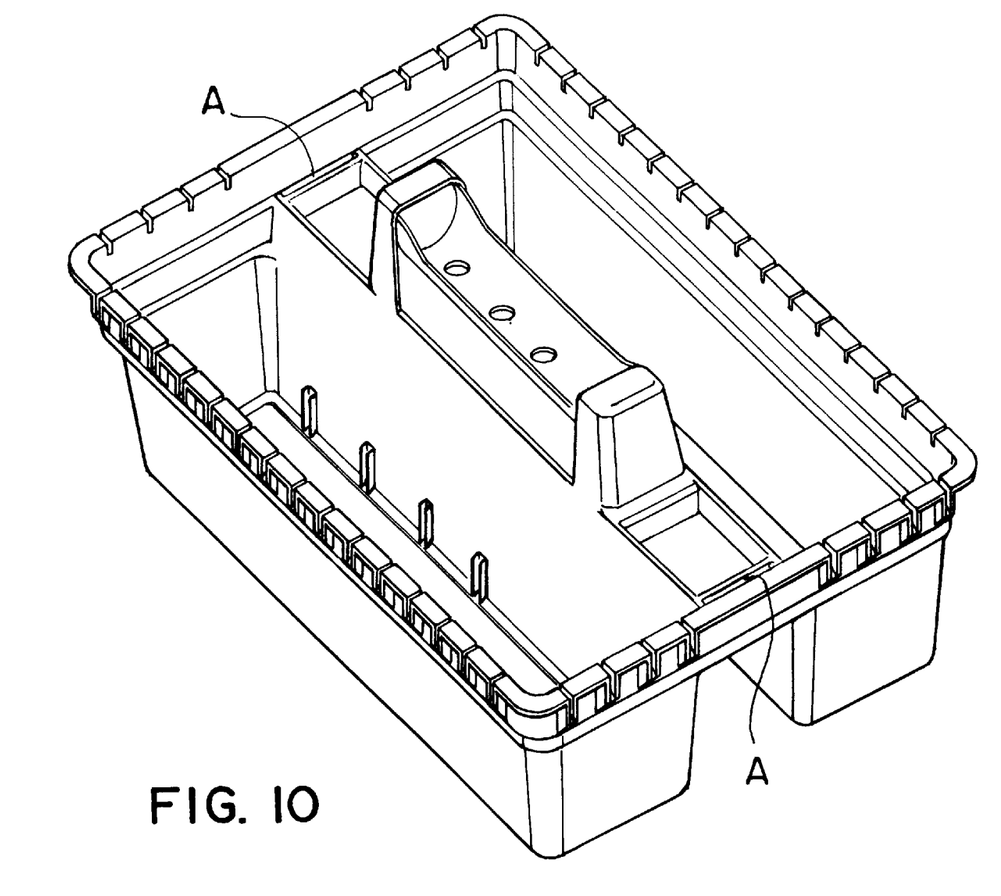
FIG. 10 provides a perspective view of the interior of the preferred embodiment of the present invention.

FIGS. 9 and 10 illustrate several conveniences that can be added to the tote. The handle has several ½ inch holes to store hemostats, screw drivers, or any tool which will fit into them. Along side the handle on each side is a tray to store small terminal tackle such as hooks, weights, or swivels. Along side each tray, at the spot marked "A" in FIG. 20 is a slot to receive a knife blade.

As shown in FIG. 9, in the preferred embodiment, the box is divided into two lobes to facilitate stacking. When the box is molded from translucent polyethylene, the handle can double for a light holder. This use of the handle to light up an open box without a lid is quite useful.

As can be seen, the preferred embodiment shown in FIGS. 9 and 10 is provided with a lip. This lip provides not only added sturdiness, but also provides added protection against accidental encounters with or disengagement of hooks contained in the beveled slots.

As noted, the handle can be designed to permit the inclusion of a removable light. A typical example of such light is one produced by Home Equipment Manufacturing Company of Westminster, Calif., which is a six inch utility, fluorescent light that is battery operated using four AA batteries. Other light fixtures such as those based on bioluminescence can be utilized and it is within the skill of the art to modify the handle in the manufacturing process to accommodate any particular light.

What is claimed is:

1. A carrying support for a fishing lure having at least one hook at an end thereof, said support comprising a generally planar, rigid, generally vertical support wall having a first side, a second side, a top edge, and at least one vertically disposed slot in said edge, said slot extending uniformly through said support wall, said slot comprising a bevel extending from the first side of the support wall where the fishing lure will rest to the opposite second side thereof a distance sufficient that a lure hook inserted in said slot, with the lure in hanging supported position, will rest against the bevel within the vertically disposed slot wherein the wall comprises a protrusion which encloses and guards the hook hanging in the slot, extending about the slot and beyond the second side surface of the support wall.

2. A fishing tote in which the walls of said tote are provided with a plurality of the slots of claim 1.

* * * * *